United States Patent [19]

Cole et al.

[11] 4,141,442
[45] Feb. 27, 1979

[54] APPARATUS FOR SEPARATING ARTICLES INTO GROUPS BY WEIGHT

[75] Inventors: Albert V. Cole, Houston, Tex.; Arthur F. Morton, Portland, Oreg.

[73] Assignee: Nabisco, Inc., East Hanover, N.J.

[21] Appl. No.: 843,807

[22] Filed: Oct. 20, 1977

[51] Int. Cl.² ............... B65G 43/08; B65G 69/00; G01G 13/00
[52] U.S. Cl. ................... 198/429; 53/502; 198/505
[58] Field of Search ............ 198/424–426, 198/429, 430, 461, 462, 504, 505, 857; 53/59 W, 159, 164; 177/50, 123; 214/2

[56] References Cited

U.S. PATENT DOCUMENTS

| 2,434,772 | 1/1948 | Sandberg | 198/429 |
| 3,007,591 | 11/1961 | Sundblad | 198/505 |
| 3,071,236 | 1/1963 | Hahn et al. | 198/462 |
| 3,797,633 | 3/1974 | Stambera | 198/505 |
| 3,846,957 | 11/1974 | Divan | 53/59 W |
| 4,065,911 | 1/1978 | Fagan | 53/59 W |

FOREIGN PATENT DOCUMENTS 358786 10/1931 United Kingdom ............... 198/505

Primary Examiner—Joseph E. Valenza
Attorney, Agent, or Firm—Gerald Durstewitz; Paul E. O'Donnell

[57] ABSTRACT

A continuous column of articles, which are individually non-uniform in weight, is divided into a series of column segments each of which has a uniform predetermined weight. The articles in the continuous column are fed by an infeed conveyor onto an intermediate conveyor one at a time. The belt of the intermediate conveyor is carried by the platform of a scale so that the cumulative weight of the articles on the intermediate conveyor is monitored. When the weight reaches a predetermined value, a pusher is activated to push the group onto an outflow conveyor which is parallel to the intermediate conveyor and is driven in the opposite direction.

5 Claims, 13 Drawing Figures

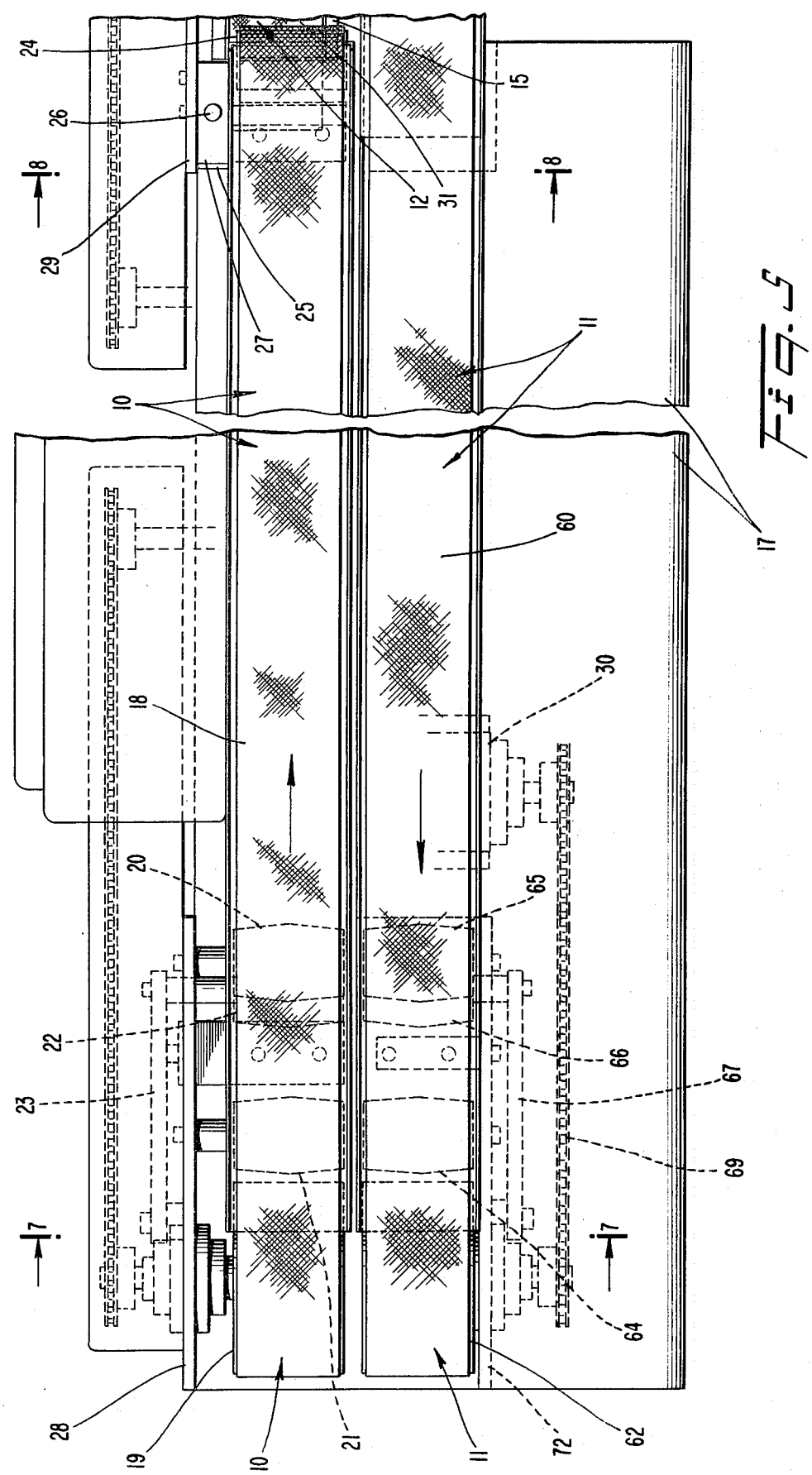

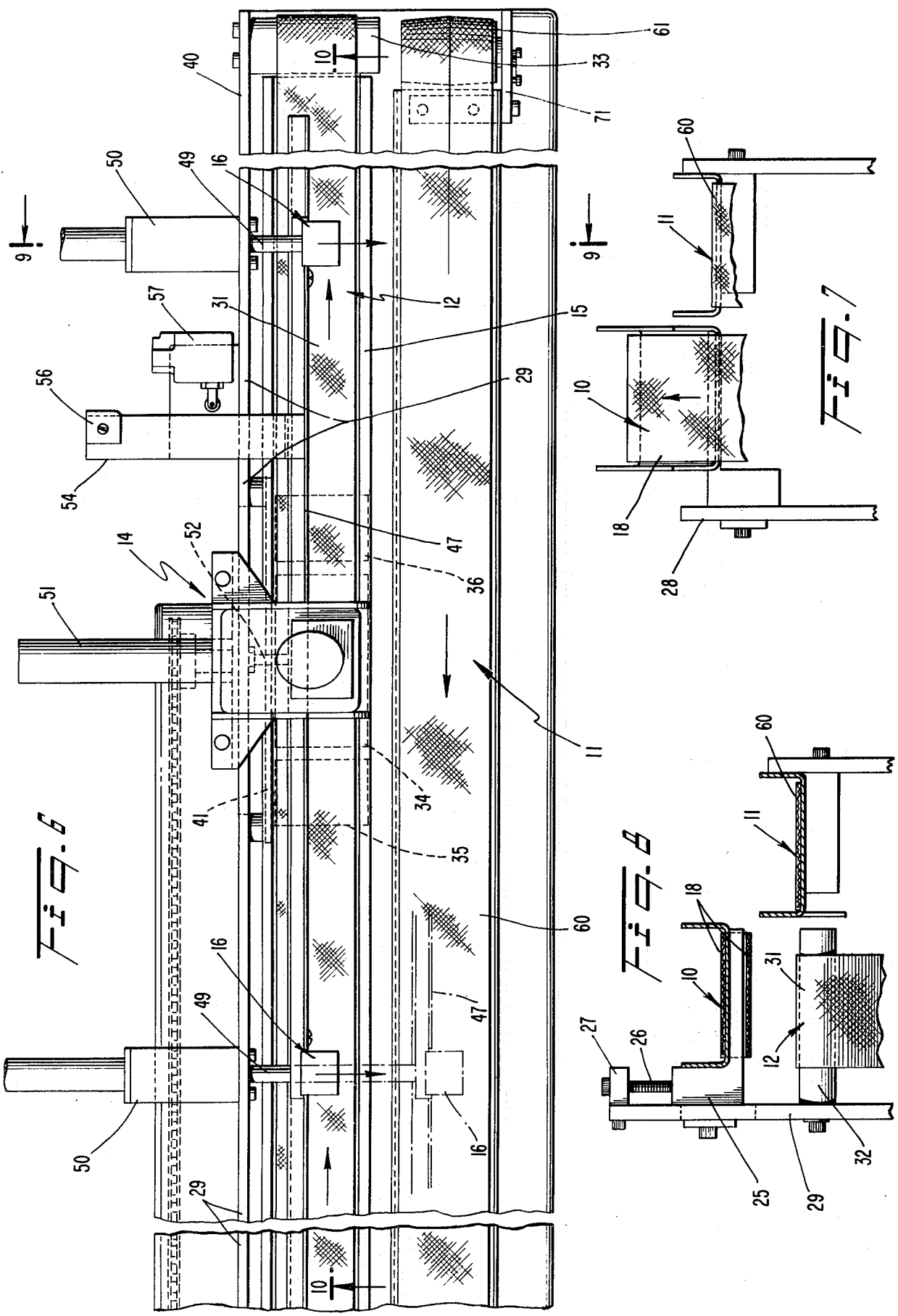

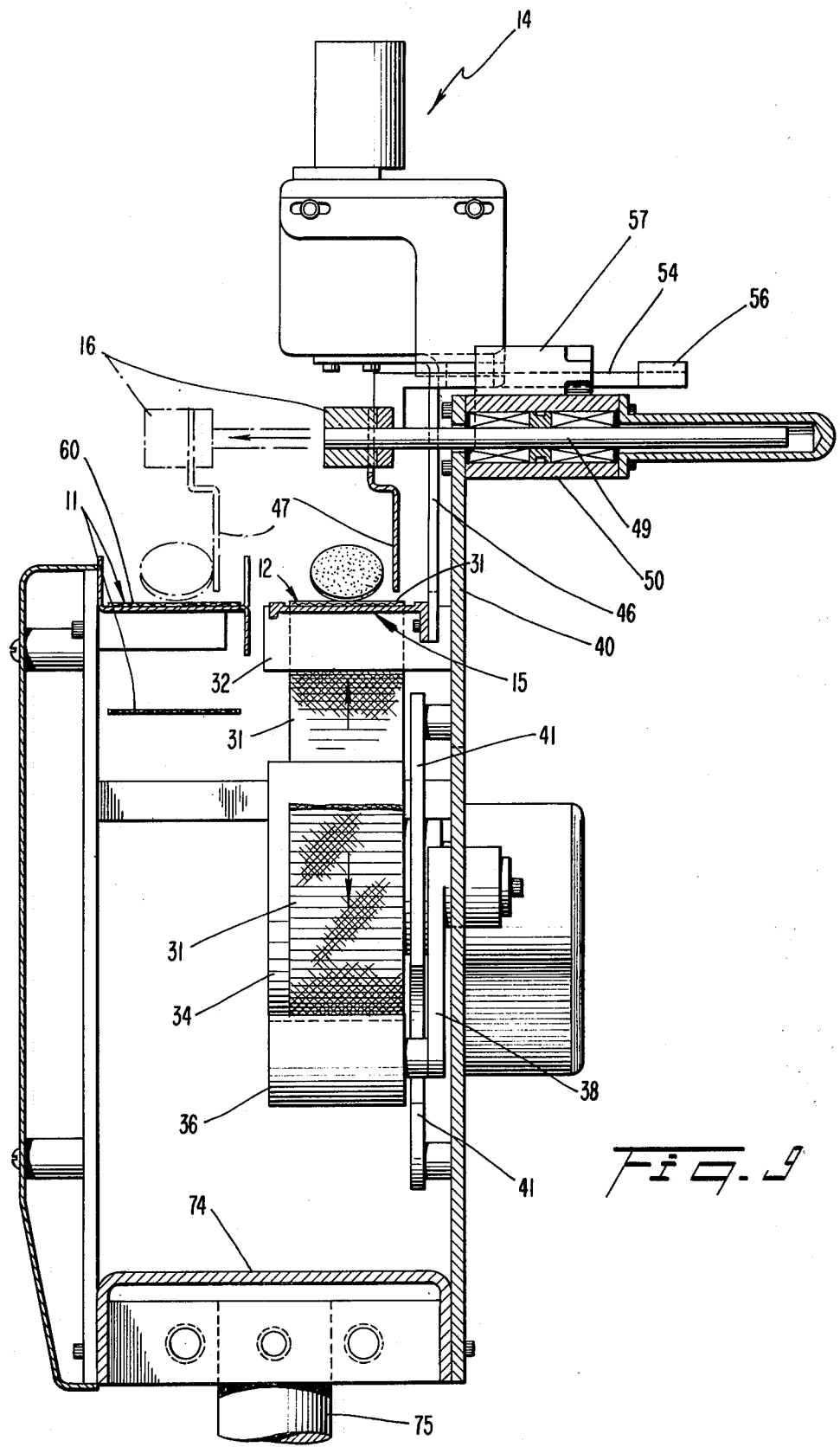

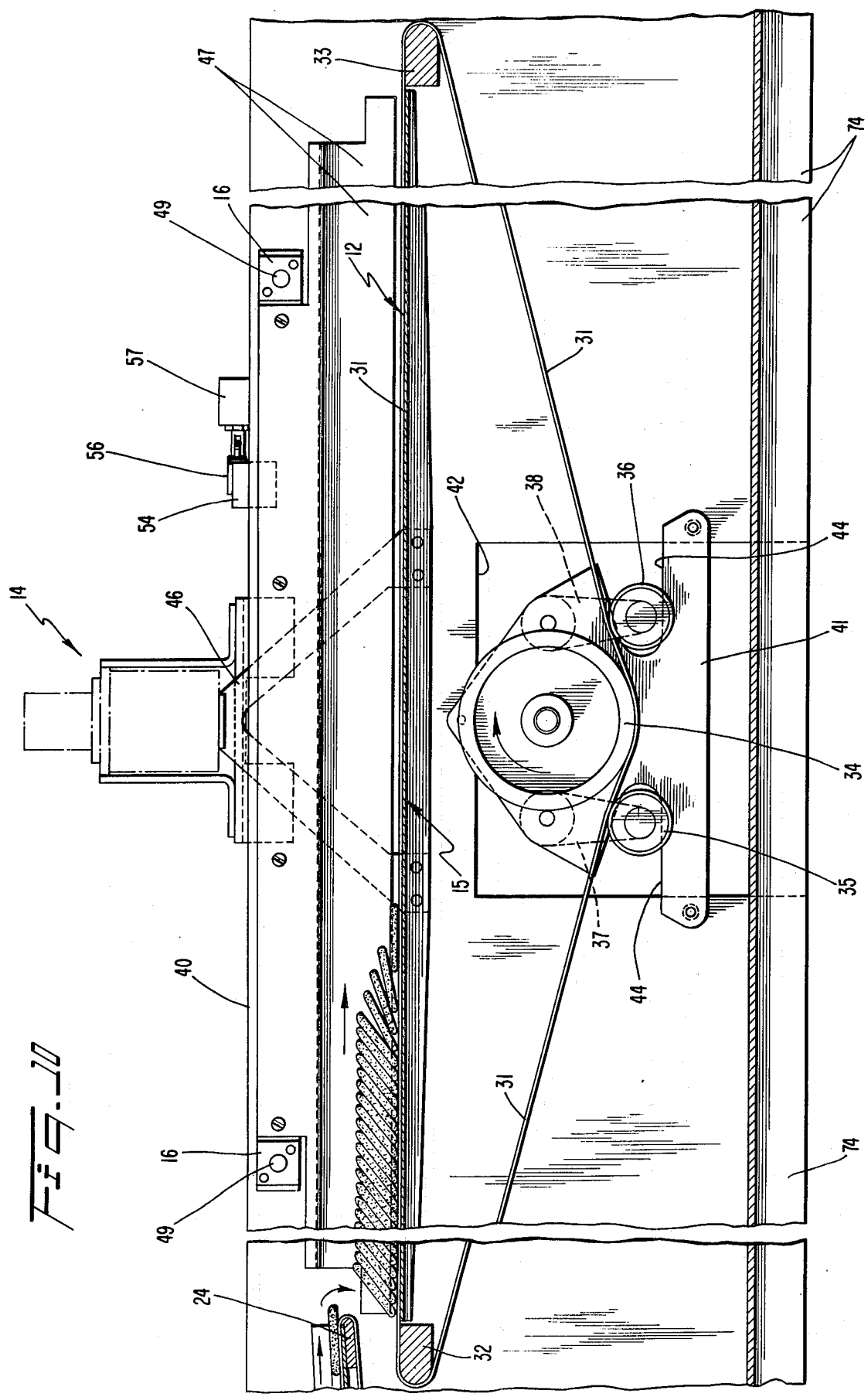

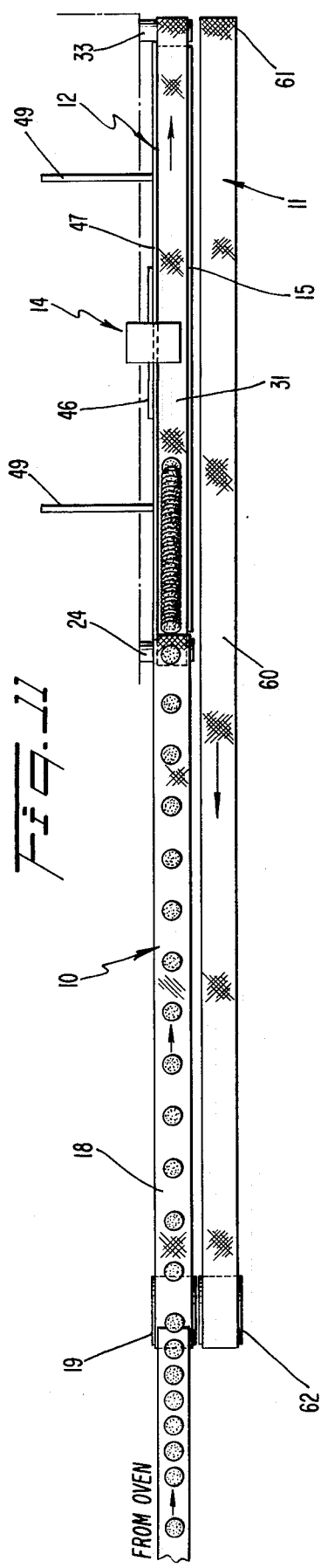
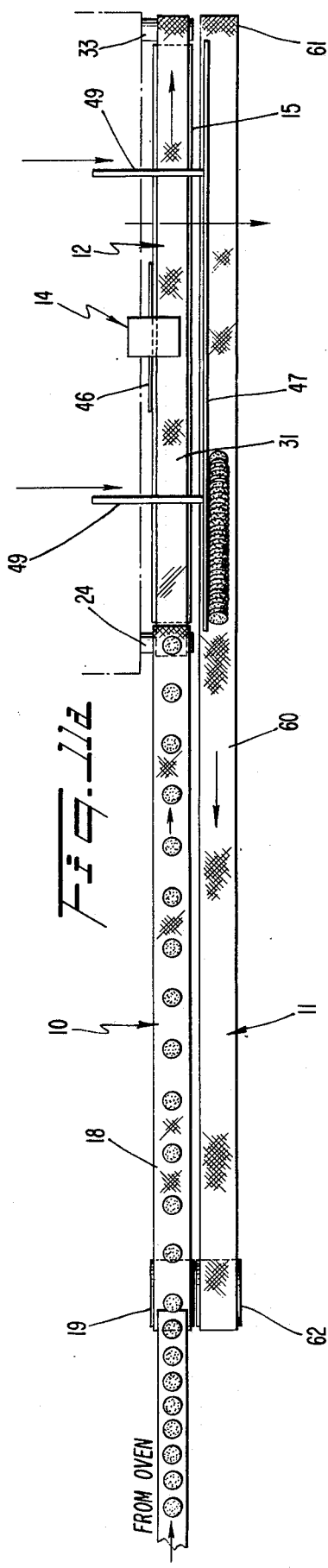
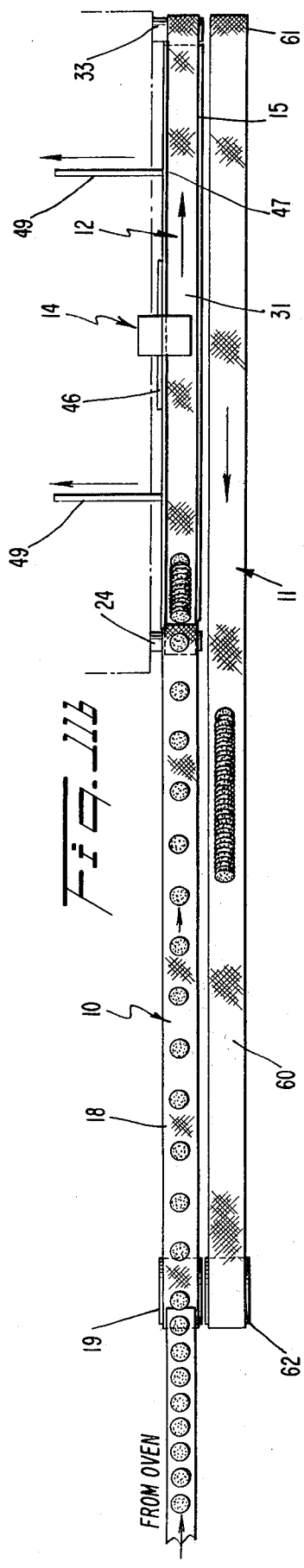

APPARATUS FOR SEPARATING ARTICLES INTO GROUPS BY WEIGHT

BACKGROUND OF THE INVENTION

The present invention relates to the weighing and grouping of articles, and, more particularly, to apparatus for dividing a continuous column of articles into column segments of uniform weight.

In the manufacture of cookies, the dough pieces and the baked cookies are arranged on conveyor belts in continuous rows which extend axially along the belts. During the manufacturing process, the product pieces are carried in turn by a number of conveyors, each conveyor maintaining the cookies in unbroken columns. Cookies which are by nature of uniform weight can be packaged automatically by machinery which counts out a predetermined number of cookies from an edge stacked column and automatically transfers that group of cookies into a package which is automatically passed through a sealing mechanism. Since the individual cookies are of uniform weight, packages containing a uniform number of cookies will likewise be of uniform weight.

Those cookies which are not of uniform nature, such as chocolate chip cookies, are conventionally packaged in two ways. They can be packaged loose in random orientation in either bags or boxes or they can be stacked in one or more columns within a package. The packaging of bags or boxes with randomly oriented cookies is easily accomplished by currently available fully automated machinery. However, considerable difficulty is experienced in filling packages to a predetermined weight with stacks of cookies, where the individual cookies vary significantly in weight. It has been necessary to package such cookies manually to insure that the package weight meets but does not greatly exceed the desired weight. The normal practice has been to shingle the continuous columns of cookies so that they overlap each other, and to station workers alongside the conveyors to count off and pick up groups of cookies and manually stack the cookies in the packages. The number of cookies designated for each stack was selected so that the packages would normally tend to be somewhat below the desired weight. The packages, still open, are then transferred to another station where a second operator weighs the package and adds an additional cookie if it is necessary to bring the package up to the listed weight. It has been found in actual practice that the operators do not count off the right number of cookies for each stack; the stacks sometimes containing too many and at other times, far too few cookies. The operation at the following station is therefore slowed down. The second operator instead of merely checking the scale to see whether a single cookie must be added, has to add or subtract a number of cookies on a trial basis which can be time consuming.

SUMMARY OF THE INVENTION

It is, therefore, an object of the present invention to provide apparatus for facilitating the packaging of articles of non-uniform weight.

Another object is to provide apparatus for automatically weighing and grouping such articles.

Another object is to provide apparatus for separating a column of articles on a conveyor into spaced groups, each group being of substantially equal weight.

The foregoing objects are accomplished by providing apparatus comprising an infeed conveyor, an outflow conveyor, an intermediate conveyor parallel to the outflow conveyor and positioned to receive articles from the infeed conveyor, means for weighing the articles on the intermediate conveyor, and pusher means responsive to the weighing means for transferring all the articles on the intermediate conveyor onto the outflow conveyor when the weight of articles on the intermediate conveyor reaches a predetermined value.

BRIEF DESCRIPTION OF THE DRAWINGS

A preferred embodiment of the invention has been chosen for the purposes of illustration and description, and is shown in the accompanying drawings, forming a part of the specification, wherein:

FIG. 5 is a top plan view of the input/output end of the apparatus.

FIG. 6 is a top plan view of the weighing and transferring end of the apparatus.

FIG. 7 is a sectional view taken along line 7—7 on FIG. 5.

FIG. 8 is a sectional view taken along line 8—8 on FIG. 5.

FIG. 9 is a sectional view taken along line 9—9 on FIG. 6.

FIG. 10 is a sectional view taken along line 10—10 on FIG. 6.

FIGS. 11, 11a, and 11b are sequential top plan views showing the operation of the apparatus.

DESCRIPTION OF THE PREFERRED EMBODIMENT

Figure 1:
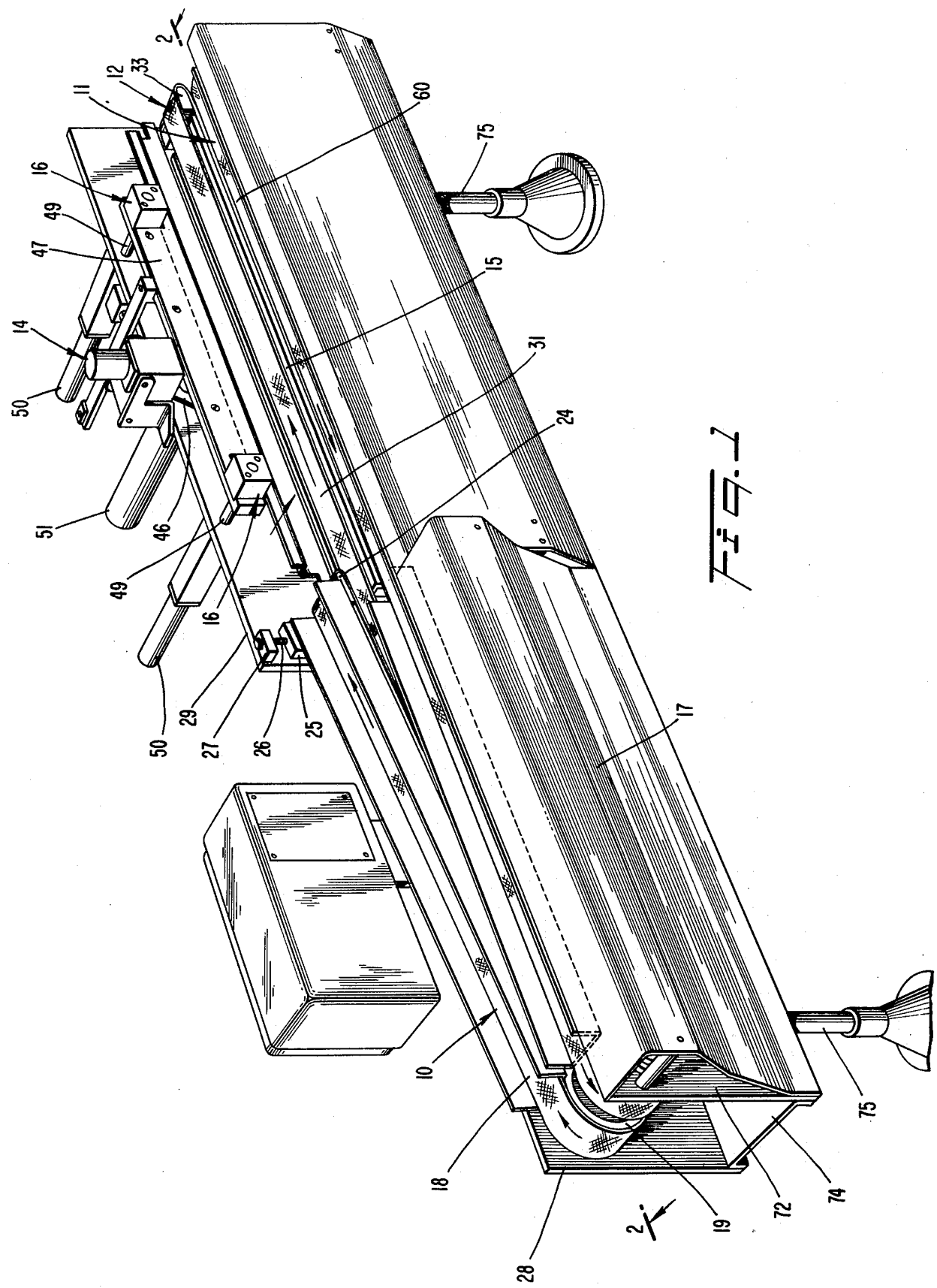
FIG. 1 is an isometric drawing of apparatus according to the present invention for separating articles into groups of substantially equal weight.

Referring now to the drawings in detail, there is shown apparatus according to the present invention contained within a frame generally including an infeed conveyor 10, an out flow conveyor 11, an intermediate conveyor 12, a scale comprising a weigh head 14 and a platform 15, a pusher arrangement 16, and a packaging table 17.

Figure 2:
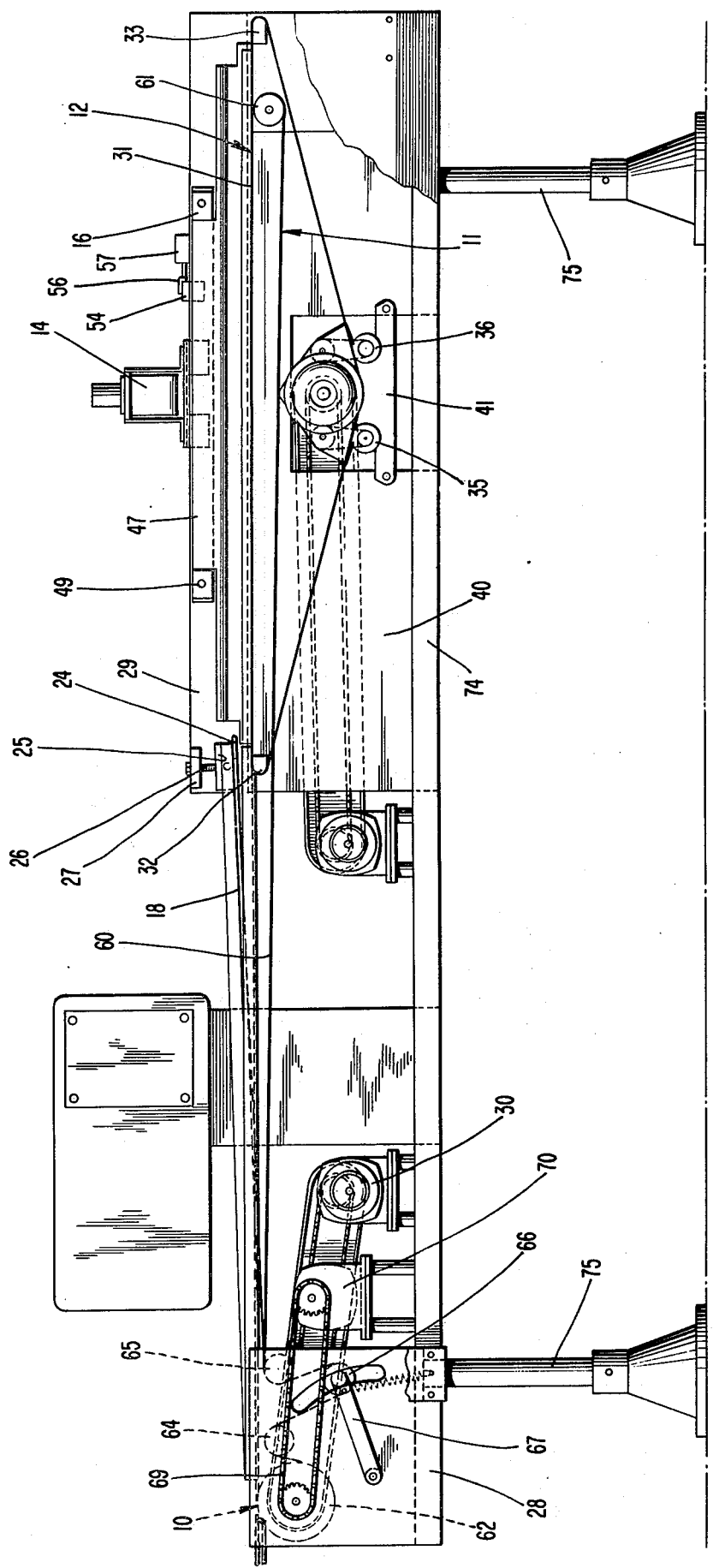
FIG. 2 is a front elevational view in section, taken along the line 2—2 on FIG. 1.
Figure 3:
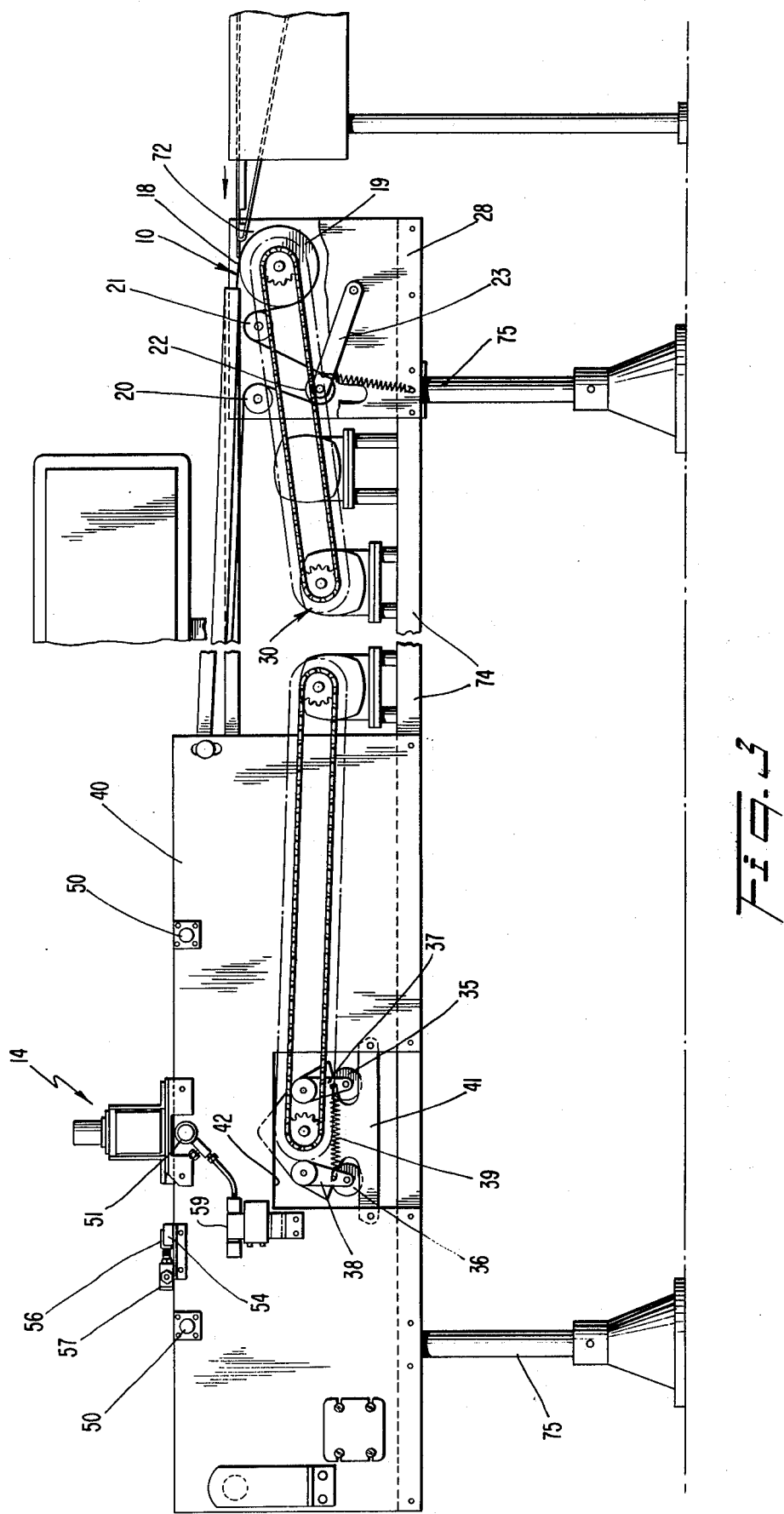
FIG. 3 is a rear elevational view of the apparatus.

The infeed conveyor 10 as shown in FIGS. 1, 2 and 3 includes a belt 18, a driver roller 19, idler rollers 20 and 21, a tensioning roller 22 mounted on a spring loaded lever 23, and a noser plate 24. The noser plate 24 is mounted to a vertically moveable plate 25 that is supported by a bolt 26 and a block 27. The block 27 is mounted on a frame plate 29 which extends along the rear edge of the intermediate conveyor and also carries the scale and the pusher arrangement. The noser plate 24 is elevated and extends over the input end of the intermediate conveyor. The roller 19 is chain driven by an electric motor 30. The rollers 19–22 are mounted on a rear vertical plate member 28 (FIG. 3).

The intermediate conveyor 12, as best shown in FIGS. 1, 2, 9 and 10, includes a belt 31, a pair of nose bars 32 and 33, a drive roller 34, and a pair of take-up rollers 35 and 36. The take-up rollers 35, 36 are mounted on pivoted arms 37 and 38 which are biased inwardly by a spring 39 (FIG. 3) extending between the arms to press the rollers against the outer surface of the belt 31.

The noser bars 32 and 33 are mounted on a vertical frame plate 40 (FIG. 9). The roller 34 and the pivoted arms 37, 39 are mounted on a generally pentagonal plate 41 which is mounted in an opening 42 in the frame plate 40. The plate 41 is formed with a pair of notches 44. The roller 34 is mounted on the front surface of the plate 41. The arms 37 and 39 are mounted on the rear surface with the rollers 35 and 36 mounted on shafts 45 that extend through the notches 44 from the arms 37, 39.

The scale platform 15 is positioned between the nose bars 32 and 33 with its upper surface aligned with those of the nose bars. The weigh head is positioned over the center of the platform which is suspended from the weigh head by a bifurcated arm 46.

The pusher arrangement 16 includes a plate 47 which extends along the rear edge of the belt 31 throughout the entire length of the scale platform 15. The pusher plate 47 is suspended on a pair of rods 49 that extend through the frame plate 40 and are positioned in axial bearing assemblies 50 mounted on the frame plate 40. The rods 49 are positioned at the ends of the pusher plate 47 and are equally spaced from the weigh head. An air actuator 51 (FIGS. 1 & 6) is mounted on the plate 40 directly below the weigh head. The air actuator 51 has a piston rod 52 connected to the pusher plate 47 to move the plate transversely across the belt 31. A bar 54 is mounted on the plate 47 and extends rearwardly over the top of the plate 40. A cam block 56 is fastened on the end of the bar to operate a switch 57 mounted to the rear face of the plate 40. The switch 47 is operated as the air actuator completes its extension stroke.

The flow of pressurized air to the air actuator is controlled by a solenoid-operated two position valve 59 mounted on the rear side of the plate 40 (FIG. 3). This valve is connected to a source of pressurized air (not shown). In one position the valve 59 connects the pressurized air source to the actuator so as to extend the piston rod 52. In the other position, the valve 59 connects the pressurized air to the actuator to retract the piston rod.

The weigh head 14 is electrically connected to the solenoid valve 59. When the weight on the platform 15 reaches a pre set valve, the head 14 produces an electrical impulse which operates the valve 59 to extend the piston rod 52. The switch 57 is also electrically connected to the valve 59 and, when the rod 52 is fully extended, the switch 57 produces a pulse which reverses the position of the valve 59 and retracts the rod 52.

The out flow conveyor 11, as shown particularly in FIG. 1, includes a belt 60, an end roller 61, a driven end roller 62, two idler rollers 64 and 65, and a tensioning roller 66 mounted on a spring loaded arm 67. The roller 62 is driven by a belt 69 from an electric motor 70. The rollers 61 are mounted on a front plate member 71 on one end of the apparatus and the rollers 62 to 66 are mounted on a second front plate member 72 on the other end of the apparatus.

The front and rear vertical frame plates are secured to a base plate member 74 and the entire apparatus is supported by a pair of pillars 75.

Figure 4:
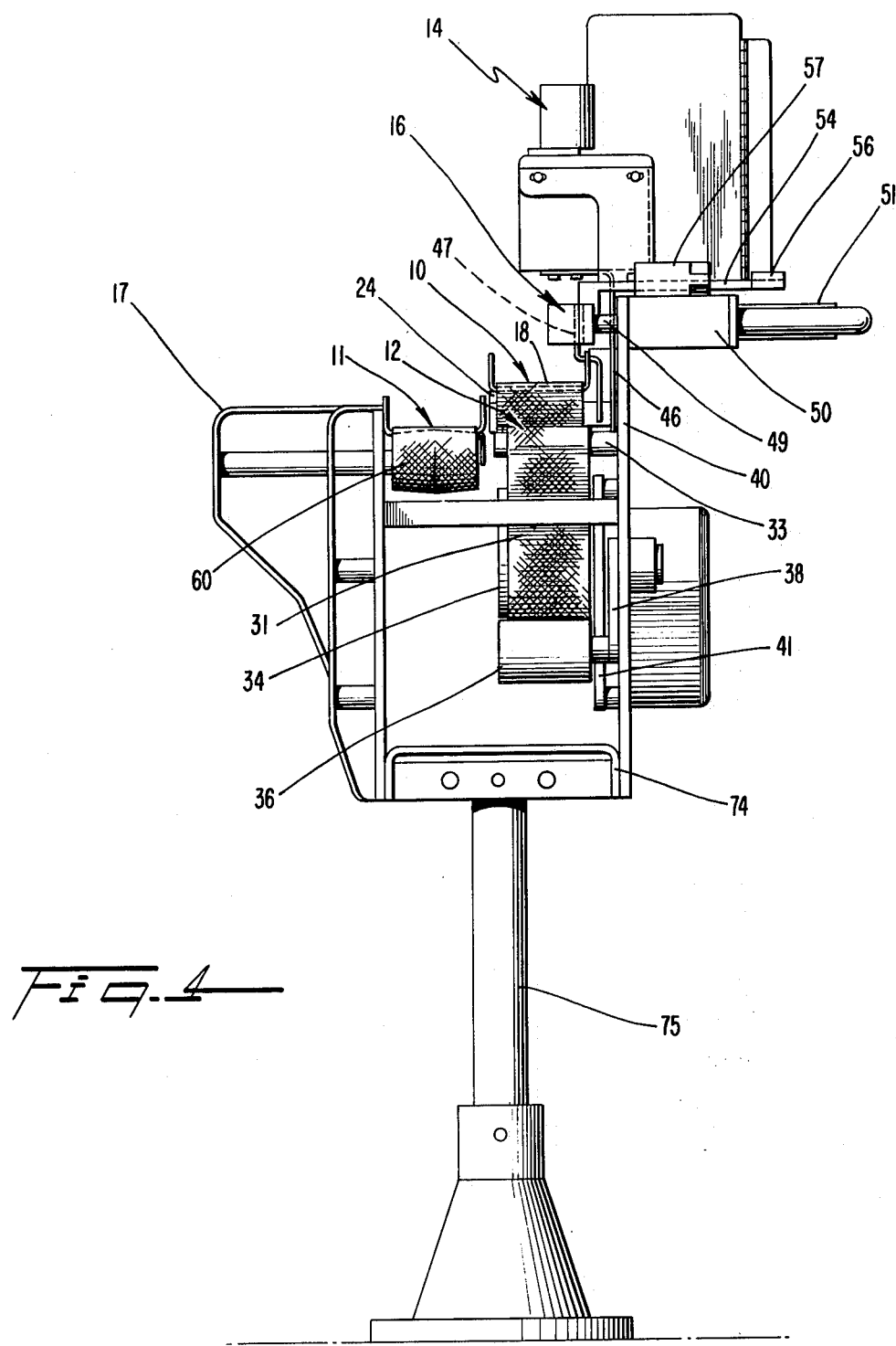
FIG. 4 is an end view taken from the right hand end of the apparatus as shown in FIG. 2.

As shown in FIGS. 1 and 4, a packaging table 17 is mounted at the left hand portion (as shown in the drawings) of the conveyor 11 for use by a worker who manually packages each column of articles.

In operation, a series of articles (for example, chocolate chip cookies) are deposited upon the infeed conveyor 10 as shown in FIG. 11. The articles are transferred from the conveyor 10 onto the conveyor 12 which is driven at a slower speed to cause the articles to be deposited on the intermediate conveyor 12 in an overlapping or shingled condition.

When the column of shingled articles reaches a predetermined weight, the scale weigh head 14 sends an electrical pulse to the two position solenoid valve 59. The valve 59 operates to connect the air actuator 51 to the pressure source so that the piston rod 52 extends. The pusher plate 47 moves the column of shingled articles onto the outflow conveyor 11. As the pusher plate reaches the end of its stroke, the cam block 56 operates the switch 57 which sends a second electrical pulse to the solenoid valve 59. The valve 59 reverses its position and connects the pressure source to the actuator 51 so as to retract the piston rod 52.

The outflow conveyor 11 carries the weighed column of shingled articles to the packaging table where the column is manually loaded into a package.

It will be seen from the foregoing that the present invention accomplishes the objects of the invention stated herein before.

We claim:

1. Apparatus for separating a column of articles of non-uniform weight into groups of equal weight comprising an infeed conveyor, an outflow conveyor, an intermediate conveyor for receiving articles from the infeed conveyor and positioned side by side with said outflow conveyor, means for weighing the articles on said intermediate conveyor, pusher means responsive to said weighing means for sliding all of the articles on said intermediate conveyor onto said outflow conveyor when the total weight of the articles on said intermediate conveyor reaches a predetermined weight, said outflow conveyor and said intermediate conveyor being driven at different velocities to space successive groups of articles on said outfeed conveyor.

2. Apparatus according to claim 1 wherein said outfeed conveyor is driven in the direction opposite to the infeed conveyor.

3. Apparatus according to claim 2 wherein said articles are substantially flat and said intermediate conveyor is driven at a slower speed than said infeed conveyor to position the articles on the intermediate conveyor in overlapping relationship.

4. Apparatus according to claim 3 wherein said weighing means includes a platform attached to a scale and the intermediate conveyor includes a conveyor belt which lies on said platform.

5. Apparatus according to claim 4 wherein said pusher means includes a vertical plate member extending along said intermediate conveyor and normally positioned on the side of said intermediate conveyor away from said outflow conveyor and means for moving said plate member across the surface of said intermediate to said outflow conveyor to push the articles on the intermediate conveyor onto the outflow conveyor in a group.

* * * * *